United States Patent [19]

Gorgens

[11] 4,075,460

[45] Feb. 21, 1978

[54] CASH DISPENSING SYSTEM

[75] Inventor: Richard A. Gorgens, Bedford, Mass.

[73] Assignee: Incoterm Corporation, Wellesley Hills, Mass.

[21] Appl. No.: 635,882

[22] Filed: Nov. 28, 1975

[51] Int. Cl.² .......................... G06K 5/00; G06F 7/00

[52] U.S. Cl. ................................ 235/420; 340/149 A

[58] Field of Search ..................... 235/61.7 B, 61.7 R; 340/149 A

[56] References Cited

U.S. PATENT DOCUMENTS

| | | | |
|---|---|---|---|
| 3,588,449 | 6/1971 | Paterson | 235/61.7 B |
| 3,657,521 | 4/1972 | Constable | 235/61.7 B |
| 3,937,925 | 2/1976 | Boothroyd | 235/61.7 B |
| 3,941,977 | 3/1976 | Voss et al. | 235/61.7 B |

*Primary Examiner*—Daryl W. Cook
*Attorney, Agent, or Firm*—Kenway & Jenney

[57] ABSTRACT

A cash dispensing system having a central computer and associated memory for maintaining customer account records, a plurality of remote transaction terminals and a communication path connecting the remote terminals with the computer. Each of the remote terminals includes a signal generator for generating data representative of a desired transaction in response to a customer-initiated operation, and for transferring that data to the computer via the communication path. The computer includes means responsive to the transaction data to generate a customer information file (CIF) signal and to transfer that signal to the remote terminal. The CIF signal is representative of a predetermined number associated with the customer. Each remote terminal includes a cash dispensing apparatus which includes a personal identification number (PIN) signal generator, a security device, a PIN signal transfer means, a CIF signal receiving means, and a cash dispenser. The PIN signal generator provides a PIN signal in response to a manual operation performed by a customer, with the PIN signal being representative of a predetermined number associated with the customer and bearing a predetermined relationship to the CIF signal. The security device includes the comparator for generating a DISPENSE signal when an applied PIN and CIF signal bear the predetermined relationship. The PIN signal transfer means provides a direct signal path for the PIN signal from the PIN signal generator to the security device. The CIF signal receiving means provides a means for receiving a CIF signal from the computer by way of the communication path and for transferring that received signal to the security device. The cash dispenser includes a cash storage portion and a dispensing mechanism for dispensing one or more units of the stored cash in response to applied DISPENSE signals.

14 Claims, 2 Drawing Figures

CASH DISPENSING SYSTEM

BACKGROUND OF THE INVENTION

This invention relates to automated banking systems, and more particularly to cash or negotiable instrument dispensing systems.

With the advent of computer controlled banking facilities wherein a number of remote automated teller stations are in communication with and controlled by a centrally located computer, certain transaction security problems have become increasingly important. More particularly, available telephone line monitoring devices and computer related equipment have been developed and used by computer thieves to secure funds from the bank systems, for example, through the use of fraudulently injected enabling signals for the cash dispensing portions of remote terminals, or through the simulation of valid transactions from points along the communication path between the computer and remote terminal.

In response to this problem, prior art systems have developed remote terminals where a customer enters a signal representative of a personal identification number (PIN), which is transferred to the central computer for recognition and which in turn authorizes the transaction to take place. This PIN is typically memorized by the user and may take the form of, for example, his social security number, his birth date or some other personal data known only to the customer and the bank. This PIN is used in conjunction with a magnetically encoded ("magnetic stripe") card which typically includes data representative of a customer account number, bank number, zone number, and, in some forms, an encrypted identification number which relates the PIN number to a customer information file (CIF) signal stored at the central computer. The encrypted identification number is often denoted as the PIN OFFSET.

In the operation of such prior art systems, the customer typically enters his PIN (via a keyboard) together with his magnetic card which is read by a card reader at the remote terminal with the resultant PIN and PIN OFFSET signals being transferred to the central computer by telephone lines. At the computer, those signals are compared with a customer information file (CIF) number stored in the computer memory which is used to identify the customer account and verify the identity of the customer. Typically, the central computer then transmits a transaction authorization signal over the telephone line to the cash dispenser at the remote terminal.

Because of the relative ease by which any of these signals on the telephone lines may be intercepted and/or simulated, practical systems in the prior art are generally provided with complex data encrypting devices whenever any signal such as the PIN, PIN OFFSET or transaction authorization signal are transmitted over the telephone line. Of course, the resultant encrypted signals are also subject to interception, but if the encryption algorithm is suitably complex, the probabilities are low that the decoding of particular signals may be accomplished by a thief. However, in the case of the authorization signal which is transmitted over the line, the mere duplication of this signal, in most cases, even though it is in encrypted form, is sufficient to activate the cash dispenser at the remote terminals. Accordingly, using the modern data processing equipment currently available, relatively sophisticated encryption techniques must be used to establish the security of the data passed over the transmission lines, and even when accomplished, the cash dispensing portion of the remote terminal is still vulnerable to simulated authorization signals.

Furthermore, in prior art systems, in order to enhance security, the remote terminal hardware which performs the encrypting and decrypting functions is generally located within the vault at the remote terminal for security purposes, thereby requiring that vault to be of sufficient size (and corresponding expense) to house that hardware in addition to the bill dispensing apparatus.

Accordingly, it is an object of the present invention to provide an improved cash dispensing system which maintains a relatively high level security while not requiring data encryption for signals passed over a communication path from a remote terminal to a central computer.

SUMMARY OF THE INVENTION

The present invention provides a cash dispensing system having a plurality of remote terminals, each of which is coupled by a communication path, e.g. telephone line, to a central computer and associated memory for maintaining customer account records. Each of the remote terminals includes a transaction data generator and a cash dispensing apparatus. The computer is responsive to transaction data (applied via the communication path) to generate a multiple bit CIF signal and to transfer that signal to the remote terminal via the communication path. The CIF signal is representative of a predetermined multiple bit CIF data word associated with the customer.

The cash dispensing apparatus includes a PIN signal generator, a security device, a PIN signal transfer means, a CIF signal receiving means and a cash dispenser. The PIN signal generator provides a multiple bit PIN signal in response to a manual operation performed by a customer, with the PIN signal being representative of a predetermined multiple bit PIN data word associated with the customer, and bearing a predetermined relationship to the CIF signal.

The security device includes a comparator which is responsive to the PIN and CIF signals to generate a DISPENSE signal only when the PIN and CIF signals bear the predetermined relationship. The PIN signal transfer means provides a direct signal path for the PIN signal entirely at the remote terminal, extending from the PIN signal generator to the security device. The CIF signal receiving means provides a path for the CIF signal as received via the communication path from the computer to the security device. The cash dispenser includes a portion for storing cash (e.g. bills) and a mechanism for dispensing one or more units of the stored cash in response to an applied DISPENSE signal.

The remote terminal may further include a magnetic stripe card reader for reading a magnetically encoded data word on a card manually inserted by the customer. A portion of the data field of the card is transformed to a PIN OFFSET signal, which may be transferred directly to the security device without leaving the remote terminal, or, in other embodiments, may be transferred to the computer by way of the communication path. This PIN OFFSET signal bears a predetermined relationship to both the PIN and the CIF signals. For example, the PIN OFFSET portion of the data word on the magnetically encoded card may be representative of the difference between the PIN signal associated with the customer and his CIF data word stored in the memory at the central computer.

In some forms of the invention, the remote terminal further includes a BIT signal generator which provides a BIT signal to the central computer (by way of the communication path), with the BIT signal being representative of the number of bits in a customer entered PIN signal.

In the operation of such embodiments, the customer may enter his magnetic card into the card reader with the resultant transaction data signal and other customer keyed data being transmitted directly to the computer over the communication path. This transaction data may include customer account number, the bank number, and the zone number. The PIN OFFSET signal may be transferred directly to the security device as the card is entered into the card reader by the customer or, alternatively, may be transferred to the computer where it is combined with the CIF signal for transferral back to the remote terminal. In addition, the customer may generate transaction data representative of other parameters of the desired transaction, such as the number of units of cash desired in a cash withdrawal transaction.

Following receipt of the magnetic card data and other transaction, data, the computer determines whether or not the card data is indicative of the insertion of a valid card and, if so, transfer the CIF signal to the remote terminal security device at this time. The computer may also respond with a signal directed to the remote terminal requesting entry of a PIN signal. The PIN signal request may be by way of an indicator lamp which is illuminated at the remote terminal. At this time, the customer enters his PIN number at a keyboard associated with the PIN signal generator by the serial depression of a succession of the digit keys. The PIN signal so generated is applied directly to the security device and, accordingly, is not transmitted over the telephone line. In addition to illuminating the indicator lamp, the PIN request signal may also establish a path through a switching network to directly connect the PIN signal generator and the security device.

In some forms of the invention, the computer may not directly transfer the CIF signal following identification of a valid card. In such embodiments, a BIT signal is generated at the remote terminal in association with the generation of the PIN signal, with the BIT signal being representative of the number of bits in the PIN signal. This BIT signal may be transferred to the central computer over the communication path. In various embodiments, alternative methods may be utilized to produce the BIT signal at the computer. For example, a predetermined number of pulses may be transferred to the computer as each digit key is depressed by the customer and the resultant sequence of pulses may be counted by the computer to produce the signal representative of the number of bits in the PIN signal, or a count signal may be generated at the remote terminal which is representative of the number of bits in the PIN signal.

Following receipt of the BIT signal, the central computer determines from the signal whether or not the appropriate number of bits have been transferred from the PIN signal generator to the security device by the customer. In the event the bit signal correctly identifies the number of bits for the CIF number stored in association with the customer data in the memory of the computer, the computer transfers the CIF signal over the communication path to the security device.

In some forms of the invention, the CIF (or combined) signal may also serve to gate the PIN signal from a temporary storage location at the remote terminal to the comparator portion of the security device. Also, when more than one bill may be dispensed, a further signal representative of the number of bills to be dispensed accompanies this CIF (or combined) signal.

As thus far described, the security device has now received the PIN signal, the PIN OFFSET signal (where employed) and the CIF signal. In response thereto, the security device combines these three signals in a predetermined manner and then detects whether the resultant signal matches a predetermined criterion. If so, the security device then generates a DISPENSE signal which is then applied to the cash dispenser. The DISPENSE signal serves to activate the dispenser to deliver the requested number of cash units to the customer.

In this system, it will be understood that at no time does the customer-memorized PIN number appear on the communication path or any other line which is external to the remote terminal. Thus, there is no way in which knowledge of this number may be acquired from the monitoring of that communication path. Furthermore, the CIF signal which is transferred by the computer to the security device over the communication path is not in itself sufficient to activate the bill dispenser and thus, monitoring of the communication path would not help the would-be thief in this case either. Accordingly, with the present system, there is no requirement to encrypt any data which is transferred between the remote terminal and the computer, and thus, a substantial amount of sophisticated data encrypting and decrypting equipment and corresponding expense associated with prior art systems may be eliminated. With the corresponding reduction in circuitry, a cash dispensing system in accordance with the present invention permits the use of smaller (and correspondingly less costly) vaults at the remote locations, while maintaining a higher level of security than prior art systems. As the further advantage to the present system, it should be noted that the transformation performed by the security device may be readily changed to accommodate any arbitrarily selected algorithm for combining the PIN, PIN OFFSET and CIF signals.

BRIEF DESCRIPTION OF THE DRAWINGS

The foregoing and other objects of this invention, the various features thereof, as well as the invention itself, may be more fully understood from the following description, when read together with the accompanying drawings in which.

BRIEF DESCRIPTION OF THE PREFERRED EMBODIMENT

Figure 1:
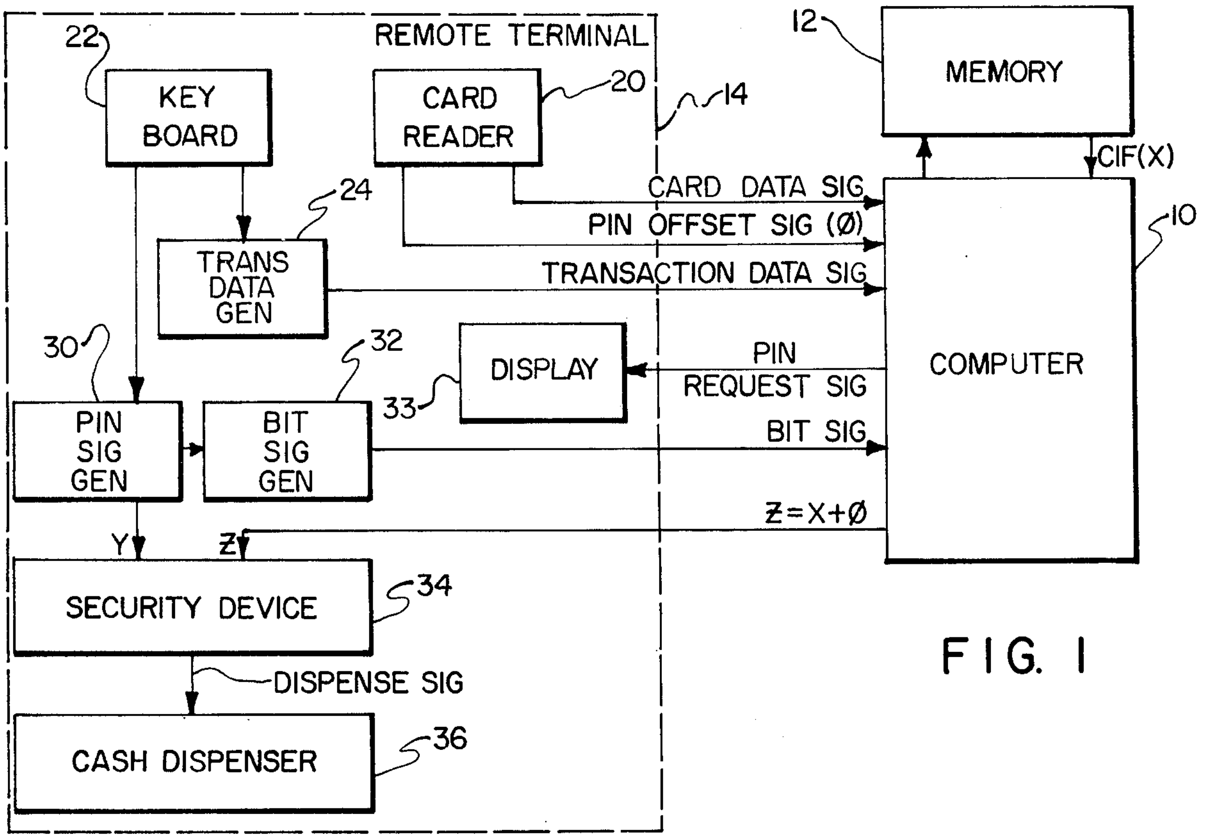
FIG. 1 shows, in block diagram form, a cash dispensing system in accordance with the present invention.

FIG. 1 shows an embodiment of the present invention in block diagram form. In that figure, a central computer 10 and associated memory 12 are shown with a single remote terminal 14 coupled by communication path indicated by the signal flow arrows in that figure. The computer 10 and memory 12 may be arranged in a configuration known in the art suitable for providing on-line or off-line banking functions, with the computer 10 and memory 12 located at a bank central office, and the remote terminal 14 being located at a remote office or at a remote location within the central office. A plurality of other terminals similar to terminal 14 may also be connected to computer 10 in a similar manner. The comunication path coupling the computer 10 and terminal 14 may be, for example, a telephone line with suitable modem equipment at the computerline and remote terminal-line interfaces for appropriately transforming signals for transmission over the lines.

In the embodiment of FIG. 1, the remote terminal 14 includes a magnetic stripe card reader 20 and keyboard 22, which provide means for entering information by way of manual operations of a customer. Terminal 14 further comprises a transaction data generator 24. Keyboard 22 and transaction data generator 24 comprise conventional devices which provide means for transforming customer activated key operations to data representative of a desired transaction, such as amount of currency, type of transaction (e.g. withdrawal from or deposit to savings account, account payment or withdrawal against a credit account), and means for transferring the transaction data over the communication path to computer 10. Card reader 20 may be one of many well-known forms which read plastic cards having data encoded on magnetic stripes, for example, using the ABA, IATA, MINTS, or Thrift Standard Track formats, and generate card data signals representative of that data. Alternatively, card reader 20 may be arranged to read perforated or optically or still other forms of encoded cards. As described below in more detail, the card reader includes means to transfer at least a portion of the card data to computer 10.

The remote terminal 14 further includes a personal identification number (PIN) signal generator 30, BIT signal generator 32, display 33, security device 34 and cash dispenser 36. The PIN signal generator 30 is responsive to customer action at keyboard 22 to generate a signal representative of a series of numbers entered by the customer. This signal is denoted by reference character Y in FIG. 1.

BIT signal generator 32 is responsive to PIN signal generator 30 to generate a signal representative of the number of bits in a PIN signal produced by generator 30. In the present embodiment, the PIN signal generator 30 includes means for transferring the BIT signal to the computer 10 over the communication path. The display 33 includes means to receive a PIN REQUEST signal from computer 10. In other embodiments of this invention, the display 33 may also display transaction data as generated by the customer or the computer 10.

The security device 34 includes a means for receiving the PIN (Y) signal and a Z signal as transferred from the computer 10. It will be understood that the signal path for the Y signal between generator 30 and security device 34 is entirely within the remote terminal.

Cash dispenser 36 includes a means for storing a plurality of cash units, such as bills, and for delivering one or more of these stored cash units to the customer in response to an applied DISPENSE signal.

The security device includes a means for comparing the applied Y and Z signals in accordance with a predetermined algorithm. For example, using the exemplary polynomial formula $Y - Z^2 = 0$, the signal generator would effectively square the number provided by the Z signal and then subtract the resultant squared signal from the Y signal. In the event the resultant difference signal equals zero, a DISPENSE signal would be generated and applied to a cash dispenser 36. Of course, alternative polynomials may be readily used.

In the embodiment of FIG. 1, the card reader 20 is configured to read data stored on the card, including a data word including information representative of identification data such as bank, zone, account numbers. This data word is transformed by reader 20 to a CARD data signal. The card further includes a data word denoted PIN OFFSET. This data word is converted by card reader 20 to a PIN OFFSET signal (denoted $\phi$ in FIG. 1). The latter signal is representative of the predetermined difference relationship between the PIN signal and a Customer Information File (CIF) number stored in the memory 12 in association with a customer's record. The CIF number is represented by the CIF signal (denoted by reference designation X in FIG. 1).

For use with the present embodiment, the PIN for a customer is a memorized number which may be representative of the customers's birth date, social security number or the like. The CIF number is representative of a record number associated with the customer at the computer. The PIN OFFSET is related to the difference between the CIF number and the PIN.

In operation of the preferred embodiment as illustrated in FIG. 1, the customer first inserts his bank or credit card into card reader 20, whereupon the card data and PIN OFFSET signals are transferred to computer 10 via the communication path. In response to the card data, the computer 10 identifies the customer account. The customer then enters transaction data representative of the desired transaction by way of keyboard 22. For example, he may activate a series of keys which indicate that a withdrawal transaction is desired in the amount of a predetermined number of cash units. Transaction data generator 24 is responsive to this customer action to forward transaction data to computer 10. Computer 10 then identifies the desired transaction and verifies whether customer's balance (as stored in memory 12) may accommodate the specified transaction.

In the event the transaction data does indicate a valid transaction, the computer 10 transfers a PIN REQUEST signal to display 33 at terminal 14. In response to this signal, the display 33 is illuminated. In alternative embodiments, the PIN REQUEST signal may control a switching network to provide a direct signal path between PIN signal generator 30 and security device 34.

The customer then enters his PIN via keyboard 22, thereby enabling generator 30 to produce PIN signal. In response thereto, BIT signal generator transfers a BIT signal (representative of the number of bits in the PIN signal) to computer 10. Computer 10 then compares the BIT signal to the number of bits in the customer's CIF number stored in memory 12. In the event there is a match, the computer generates a combined signal (Z) representative of the sum of the X and $\phi$ signals. This signal is then transferred via the communication path to the security device 34. At that point, the device 34 then compares the Y and X signals as described above, and generates the DISPENSE signal in the event the polynomial is satisfied. In response to a generated DISPENSE signal, the cash dispenser 36 delivers a cash unit to the customer.

In other embodiments, the BIT signal generator 32 is not required and the above operation is carried out without the comparison of the number of bits in the PIN with the number of bits in the CIF signals. In still other embodiments, the system may be operated without display 33 and the PIN REQUEST signal, but where the customer enters his PIN regardless of whether the computer indicates whether a valid transaction has been specified. In still other alternative embodiments, the Z signal may include a signal representative of a requested number of bills so that the DISPENSE signal directs dispenser 36 to deliver that number of cash units to the customer. Furthermore, the card reader 20 is not required for cash dispensing systems where the transaction data is entirely provided by a customer-controlled transaction data generator, rather than provided in part by an encoded card, or the like. Otherwise, operation of these latter embodiments proceeds as described above in conjunction with the system of FIG. 1. Of course, alternative comparison algorithms may be readily programmed into the security device 34. In such algorithms, predetermined bit weighting may be used in addition to or in lieu of algebraic transformations.

It will be understood that in the presently-described embodiment, the data sent over the communication path does not include the customer-memorized PIN, nor does that data include a signal which in itself is sufficient to authorize the activation of the cash dispenser.

Figure 2:
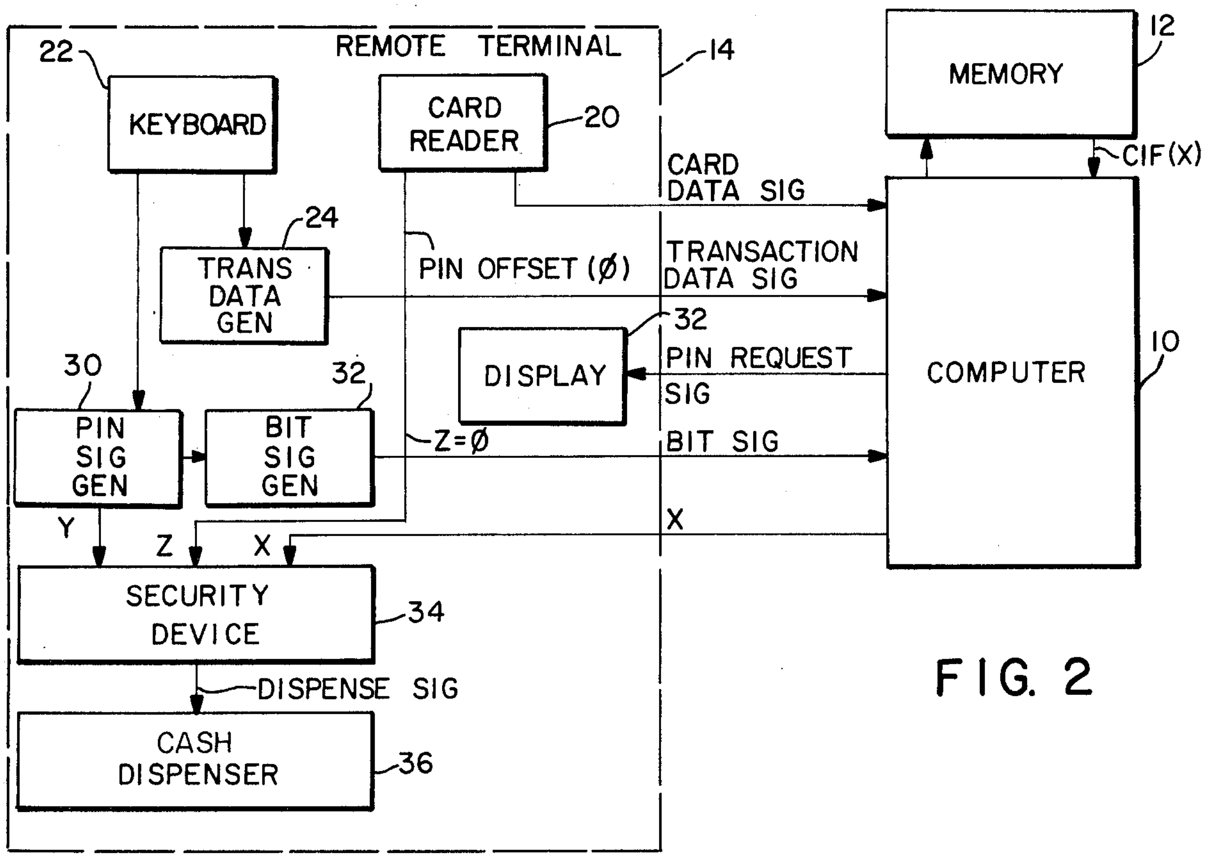
FIG. 2 shows, in block diagram form, an alternative configuration for the system of FIG. 1.

An alternative embodiment is illustrated in FIG. 2 wherein the elements which have corresponding portions in the embodiment of FIG. 1 are identified with identical reference numerals. The principal difference between embodiments of FIG. 1 and FIG. 2 is the path of the PIN OFFSET signal ($\phi$). In FIG. 2, the PIN OFFSET signal is denoted as the Z signal and is transferred from card reader 20 directly to security device 34 without passing over the transmission line, while the computer 10 transmits only the CIF signal (X) over the communication path. In the embodiment of FIG. 2, the security device is a three input circuit which performs a three variable polynomial computation, e.g. $X^2 + Y^2 + Z = 0$. In the event the polynomial is satisfied for an applied set of signals (X, Y, Z), the security device 36 generates a DISPENSE signal, which in turn activates the cash dispenser 36.

Thus, it will be understood that the embodiment of FIG. 2 operates in a substantially similar manner to the embodiment of FIG. 1, except that both the PIN OFFSET and PIN signals are retained wholly within terminal 14. Of course, the embodiment of FIG. 2 may also be configured with the variations described above in conjunction with the embodiment of FIG. 1 (e.g. without display 32, without bit signal generator 32, or without card reader 20).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A cash dispensing system having a central computer and associated memory and computer signal transfer means, for maintaining customer account records, at least one remote transaction terminal, and a communication path interconnecting said remote terminal with said computer, wherein each of said remote terminals includes means for generating a transaction data signal representative of a desired transaction in response to a customer initiated operation, and for transferring said transaction data signal to said computer, and wherein said computer signal transfer means includes means responsive to said transaction data signal from a remote terminal to generate a multiple bit customer information file (CIF) signal and to transfer said CIF signal to said remote terminal via said path, said CIF signal being representative of a predetermined multiple bit CIF data word associated with said customer, and said remote terminals include a cash dispensing apparatus comprising:

A. input means comprising a personal identification number (PIN) signal generator for generating a multiple bit PIN signal in response to a manual operation performed by said customer, said PIN signal being representative of a predetermined multiple bit PIN data word associated with said customer and bearing a predetermined relationship to said CIF signal, B. a security device including a comparator means, said comparator means being responsive to said PIN and CIF signals to generate a DISPENSE signal only when said PIN and CIF signals bear said predetermined relationship, C. transfer means comprising a PIN signal transfer means for transferring said PIN signal directly to said security device, D. receiving means comprising a CIF signal receiving means for receiving said CIF signal as transferred from said computer and for transferring said received CIF signal to said security device, and E. a cash dispenser for storing cash units and dispensing one or more of said cash units in response to said DISPENSE signal.

2. System according to claim 1 wherein said input means further includes:

A. means for generating a BIT signal representative of the number of bits in said PIN signal, and said transfer means further includes:

B. BIT signal transfer means for transferring said BIT signal from said remote terminal to said computer via said path, and wherein each customer record includes a BIT data representative of the number of bits in said PIN data word associated with that customer, and wherein further said computer signal transfer means includes means responsive to said BIT signal to initiate said transferral of said CIF signal to said remote terminal when said BIT signal corresponds to said BIT data and to inhibit said transferral otherwise.

3. System according to claim 2 wherein said input means further comprises:

a card reader having a transducer for generating a CARD signal as a customer-inserted card is driven past said transducer, said CARD signal being representative of a CARD data word encoded on said card, wherein said CARD signal comprises an OFFSET signal, said OFFSET signal being representative of a predetermined multiple bit OFFSET data word, and bearing a predetermined relationship to said PIN and CIF signals.

4. System according to claim 3 wherein said transfer means further comprises an OFFSET signal transfer means for transferring said OFFSET signal directly to said security device.

5. System according to claim 4 wherein said comparator means is operative to generate said DISPENSE signal only when said PIN, CIF, and OFFSET signals bear said predetermined relationship, and said comparator means is inoperative otherwise.

6. System according to claim 3 wherein said transfer means further comprises an OFFSET signal transfer means for transferring said OFFSET signal to said computer.

7. System according to claim 6 wherein said computer includes means responsive to said OFFSET signal to generate a COMBINED signal from said CIF and OFFSET signals and to transfer said COMBINED signal to said remote terminal.

8. System according to claim 7 wherein said receiving means further comprises a COMBINED signal receiving means for receiving said COMBINED signal from said computer and for transferring said received COMBINED signal to said security device, and wherein said comparator means is operative to generate said DISPENSE signal only when said PIN signal and the CIF and OFFSET signals of said COMBINED signal bear said predetermined relationship, and said comparator means is inoperative otherwise.

9. System according to claim 1 wherein said input means further comprises:

a card reader having a transducer for generating a CARD signal as a customer-inserted card is driven past said transducer, said CARD signal being representative of a CARD data word encoded on said card, wherein said CARD signal comprises an OFFSET signal, said OFFSET signal being representative of a predetermined multiple bit OFFSET data word, and bearing a predetermined relationship to said PIN and CIF signals.

10. System according to claim 9 wherein said transfer means further comprises an OFFSET signal transfer means for transferring said OFFSET signal directly to said security device.

11. System according to claim 10 wherein said comparator means is operative to generate said DISPENSE signal only when said PIN, CIF and OFFSET signals bear said predetermined relationship, and said comparator means is inoperative otherwise.

12. System according to claim 9 wherein said transfer means further comprises an OFFSET signal transfer means for transferring said OFFSET signal to said computer.

13. System according to claim 12 wherein said computer includes means responsive to said OFFSET signal to generate a COMBINED signal from said CIF and OFFSET signals and to transfer said COMBINED signal to said remote terminal.

14. System according to claim 13 wherein said receiving means further comprises a COMBINED signal receiving means for receiving said COMBINED signal from said computer and for transferring said received COMBINED signal to said security device, and wherein said comparator means is operative to generate said DISPENSE signal only when said PIN signal and the CIF and OFFSET signals of said COMBINED signal bear said predetermined relationship, and said comparator means is inoperative otherwise.

* * * * *